United States Patent
Guerreiro

(10) Patent No.: US 9,975,469 B2
(45) Date of Patent: May 22, 2018

(54) SYSTEM FOR DISPLAYING INFORMATION IN A VEHICLE

(75) Inventor: Pierre Guerreiro, Eaubonne (FR)

(73) Assignee: Faurecia Interieur Industrie, Nanterre (FR)

( * ) Notice: Subject to any disclaimer, the term of this patent is extended or adjusted under 35 U.S.C. 154(b) by 247 days.

(21) Appl. No.: 14/232,548

(22) PCT Filed: Jul. 12, 2012

(86) PCT No.: PCT/EP2012/063720
§ 371 (c)(1),
(2), (4) Date: Jan. 13, 2014

(87) PCT Pub. No.: WO2013/007794
PCT Pub. Date: Jan. 17, 2013

(65) Prior Publication Data
US 2014/0145840 A1   May 29, 2014

(30) Foreign Application Priority Data
Jul. 12, 2011   (FR) ...................................... 11 56349

(51) Int. Cl.
*B60Q 1/00* (2006.01)
*B60K 37/06* (2006.01)

(52) U.S. Cl.
CPC ................ *B60Q 1/00* (2013.01); *B60K 37/06* (2013.01); *B60K 2350/2043* (2013.01)

(58) Field of Classification Search
None
See application file for complete search history.

(56) References Cited

U.S. PATENT DOCUMENTS

| | | | | |
|---|---|---|---|---|
| 8,937,536 | B2* | 1/2015 | Hatakeyama et al. | 340/435 |
| 2002/0149495 | A1* | 10/2002 | Schach et al. | 340/815.78 |
| 2003/0020604 | A1* | 1/2003 | Fischer et al. | 340/442 |
| 2007/0120693 | A1* | 5/2007 | Vij | 340/632 |
| 2010/0097448 | A1* | 4/2010 | Gilbert et al. | 348/51 |

(Continued)

FOREIGN PATENT DOCUMENTS

| | | |
|---|---|---|
| EP | 0005436 | 11/1979 |
| FR | 2824510 | 11/2002 |

OTHER PUBLICATIONS

International Search Report for PCT/EP2012/063720, dated Jan. 21, 2013, 2 pages (translated).

*Primary Examiner* — Julie Lieu
(74) *Attorney, Agent, or Firm* — Reising Ethington P.C.

(57) ABSTRACT

A system for displaying vehicle information in the passenger compartment of the vehicle includes an information acquisition device, a display device, and a control unit. The information acquisition device acquires at least one piece of information related to the vehicle, and the display device is configured to display the piece(s) of information in the passenger compartment. The display device includes at least two light sources. The control unit is configured to receive the acquired piece(s) of information and to control the light sources according to a stored pattern corresponding to the received information. For each piece of information received by the control unit, the stored pattern includes sequential lighting of the light sources according to a lighting sequence depending on the received information.

19 Claims, 2 Drawing Sheets

(56) References Cited

U.S. PATENT DOCUMENTS

2010/0198428 A1* 8/2010 Sultan et al. .................... 701/2
2011/0220469 A1* 9/2011 Freiburger et al. ........ 200/61.54
2013/0002414 A1* 1/2013 Konet et al. ................. 340/436
2013/0187921 A1* 7/2013 Gilbert et al. ............... 345/426

* cited by examiner

SYSTEM FOR DISPLAYING INFORMATION IN A VEHICLE

TECHNICAL FIELD

The present invention relates to a system for displaying at least one piece of information relative to a vehicle in the passenger compartment of said vehicle, comprising:
- an information acquisition device for acquiring at least one piece of information related to the vehicle;
- a display device comprising at least two light sources, and which is configured to display the or each piece of information related to the vehicle in the passenger compartment of the vehicle;
- a control unit, which is configured to receive the or each piece of information acquired by the acquisition device and to control the lighting of the light sources according to a stored pattern corresponding to the received piece of information.

BACKGROUND

In a vehicle, it is useful, for safety and/or driving comfort reasons, to provide the driver with information on his driving, his driving environment, and the status of a certain number of operating parameters of the vehicle.

To that end, it is possible to provide a dedicated lighted indicator on the dashboard for each piece of information to be communicated to the driver. Each of these lighted indicators is associated with a particular pictogram. These lighted indicators are arranged side by side on the vehicle dashboard.

However, there is an increasing quantity of information that it is desirable to provide to motorists and for which it is necessary to provide specific lighted indicators on the dashboard. This additional information for example relates to the presence of obstacles around the vehicle, the comparison between the speed of the vehicle and an authorized speed limit, the presence of traffic jams, etc.

To provide this additional information to the driver, it is possible to design a dedicated pictogram for each piece of information and to add the corresponding lighted indicators on the dashboard next to the existing indicators. However, the space available on the dashboard to arrange such lighted indicators is limited, which limits the quantity of information that can be provided to the driver or requires squeezing the indicators closer together or decreasing the size of the pictograms. Furthermore, the multiplication of different pictograms, which are small and each correspond to a specific piece of information, contributes to saturating the attention of the vehicle's driver and may pose a danger by distracting the driver from driving the vehicle.

SUMMARY

One aim of the invention is to provide a display in a vehicle making it possible to communicate a significant quantity of information to the driver that is also aesthetically pleasing and which can be easily sensed by the occupants of the vehicle, in particular the driver, and which is arranged so as not to disrupt driving of the vehicle.

To that end, the invention relates to a display system of the aforementioned type, wherein for each piece of information received by the control unit, the stored pattern comprises the sequential lighting of the two light sources of the display device according to a lighting sequence that depends on the received piece of information.

The display system according the invention may also comprise one or more of the following features, considered alone or according to any technically possible combination(s):
- the display device is arranged to display the or each piece of information directly on an outer surface of a trim element of the vehicle,
- the display device is arranged to display the or each piece of information directly on an outer surface of the dashboard of the vehicle,
- the lighting sequence is defined by the lighting order of the light sources, the length of lighting, the color and/or the intensity of each light source,
- the acquisition device comprises at least one sensor, capable of taking measurements relative to an operating parameter of the vehicle, at least one piece of information to be displayed by the display system being determined from the value of said parameter,
- the display device is capable of displaying at least two different pieces of information, each piece of information corresponding to a specific lighting sequence of the light sources, and
- the display device comprises more than two light sources, the lighting sequence comprising the sequential lighting of at least two of said light sources.

The invention also relates to a vehicle comprising a display system as previously described.

The invention also relates to a method for displaying at least one piece of information relative to a vehicle using a display system as previously described, comprising the following steps:
- acquiring at least one piece of information relative to the vehicle;
- controlling the lighting of at least two light sources based on the piece of information acquired during the acquisition step according to a stored pattern corresponding to the piece of information received during the acquisition step; and
- displaying said pattern in a passenger compartment of the vehicle;

characterized in that, for each acquired piece of information, the stored pattern comprises the sequential lighting of the two light sources according to a lighting sequence that depends on the received piece of information.

BRIEF DESCRIPTION OF THE DRAWINGS

The invention will be better understood upon reading the following description, provided solely as an example and done in reference to the appended drawings, in which.

DETAILED DESCRIPTION OF THE ILLUSTRATED EMBODIMENT

Figure 1:
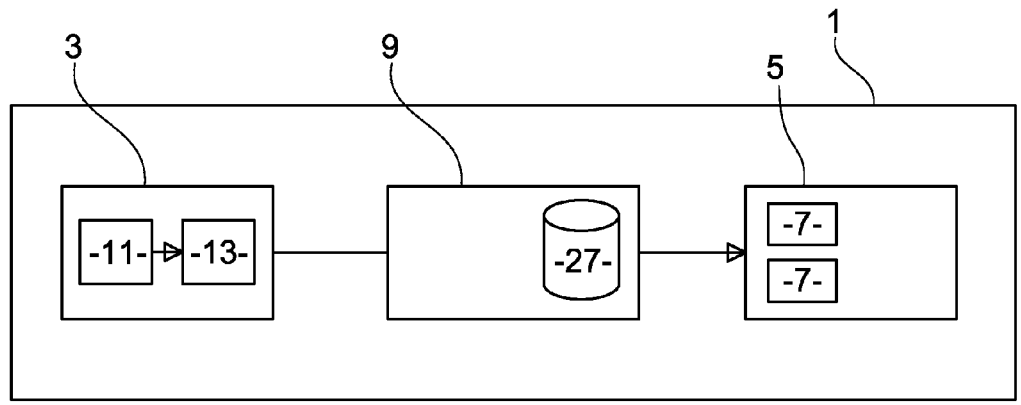
FIG. 1 is a diagrammatic illustration of the display system according to the invention.

FIG. 1 diagrammatically shows a system 1 for displaying at least one piece of information relative to a vehicle. The information relative to the vehicle is in particular:
- a piece of information relative to an operating parameter of the vehicle, such as information relative to the quantity of fuel remaining in the fuel tank, the charge of the battery, the operation of the electronic circuits, the oil level, etc., a piece of information relative to the driving of the vehicle, such as information relative to the speed of the vehicle, the braking of the vehicle, the change of traffic lane, etc.; or a piece of information relative to the environment of the vehicle, such as the length of traffic jams, the presence of obstacles around the vehicle, the presence of other vehicles in the blind spot, the road condition, etc.

This list of types of information that may be displayed by the display system 1 is non-limiting. In general, the display system 1 may display any information relative to the vehicle that may be determined using at least one sensor or other measuring device provided in the vehicle.

The vehicle is more particularly a motor vehicle.

The display system 1 is integrated into a vehicle. It comprises:

an acquisition device 3 capable of acquiring a piece of information relative to the vehicle;

a display device 5 comprising at least two light sources 7, configured to display the piece of information relative to the vehicle in the passenger compartment of the vehicle; and a control unit 9 configured to receive the information from the acquisition device 3 and to control the lighting of the light sources 7 according to a stored lighting sequence specific to the received piece of information.

The acquisition device 3, the display device 5 and the control unit 9 are described in more detail in the rest of the specification.

The acquisition device 3 for example comprises at least one sensor 11 capable of performing a measurement related to the piece of information to be displayed. The sensor 11 is provided in the vehicle. The nature of the sensor 11 depends on the information to be displayed. It is for example a speed sensor, capable of measuring the value of the vehicle's speed, a temperature sensor, capable of measuring the engine temperature, a battery charge sensor, a reversing radar, etc., this list not being exhaustive.

According to one embodiment, the acquisition device 3 further comprises interpretation means 13 capable of deducing the piece of information to be displayed from the measurement done by the sensor 11. In the event the sensor 11 is a speed sensor, the interpretation means 13 are for example capable of comparing the value of the speed measured by the speed sensor 11 to threshold values to deduce therefrom whether the vehicle is speeding or traveling at a speed below or equal to the authorized speed. These threshold values are for example stored or received using a second sensor, for example a GPS sensor. In that case, the information displayed by the display device 5 is for example the fact that the vehicle is speeding or traveling at a speed below or equal to the authorized speed. In that case, the measurement done by the sensor 11 is different from the displayed information, the displayed information being deduced from the measurement done by the sensor 11 by the interpretation means 13.

Alternatively, the displayed information corresponds directly to the measurement done by the sensor 11.

The display device 5 displays the information directly on a trim element 15 of the vehicle, in particular on an outer surface of a trim element 15 of the vehicle. In the example illustrated in FIG. 1, the trim element 15 is a vehicle dashboard.

Throughout the description, "outer" refers to that which is visible from inside the passenger compartment, and "inner" refers to that which is not visible. The terms "front" and "back" are defined relative to the standard "front" "back" orientation of the vehicle.

The trim element 15 comprises a skin 17 forming the outer surface of the trim element 15. The display device 5 is configured to display the information directly on the outer surface of the skin 17 of the trim element 15. The skin 17 is translucent. It is for example made from TPO (Thermoplastic PolyOlefin). The information is displayed directly on the outer surface of the skin 17 by diffusion of the light coming from each of the light sources 7 through the translucent skin 17. More specifically, the skin 17 of the trim element 15 comprises a display zone 19 on which the information to be displayed is displayed. The display zone 19 is formed by a portion of the skin 17. It is for example situated at the steering wheel, in particular between the steering column and the instrument panel. Alternatively, it is situated in the upper central zone of the dashboard.

Figure 3:
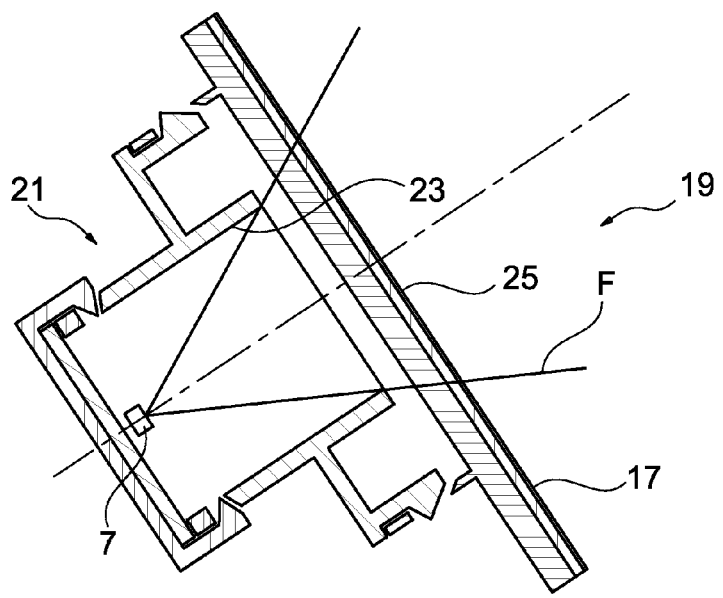
FIG. 3 is a diagrammatic cross-sectional illustration of part of the display device of FIG. 2.

In a known manner, and as illustrated in the FIG. 3, each light source 7 is positioned in a light box 21 comprising an upper opening 23 covered by the skin 17, and in particular by the display zone 19 of the skin 17. One part of such a display device formed by a light box 21 comprising a light source 7 and by a portion of the display zone 19 is for example described by published patent applications FR 2 917 350, FR 2 930 917, FR 2 920 119 and FR 2 937 604.

Figure 2:
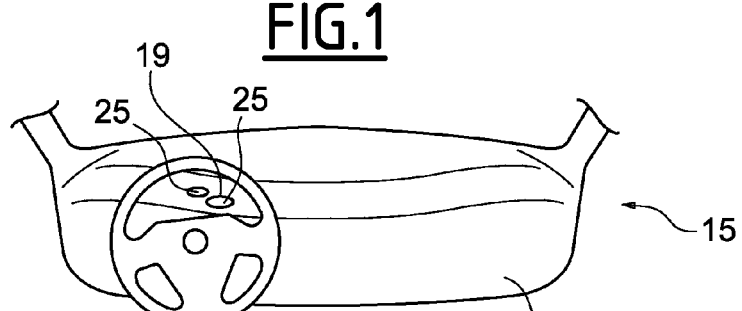
FIG. 2 is an illustration of a dashboard provided with a display device of the display system of FIG. 1.

Each light source 7, when lit, emits a light beam F towards the display zone 19 so as to form a corresponding light spot 25 in the display zone 19 (see FIG. 2). This light spot 25 has any shape whatsoever. In the illustrated example, it is circular. In the illustrated embodiment, the light spots 25 resulting from each of the light sources 7 of the display device 5 have identical shapes. Optionally, if one wishes to give a particular shape to the light spot 25 displayed on the skin 17, a mask of a suitable shape is inserted between each light source 7 and the skin 17.

Each light source 7 for example comprises a diode of the light-emitting diode type. The color of the light beam F emitted by each light source 7 is advantageously adjustable. To that end, the diode is for example an RGB diode. Alternatively, each light source 7 comprises three distinct diodes, respectively emitting a blue, red and green light beam, the beam F resulting from the combination of the beams coming from those three diodes.

Alternatively, the light sources 7 may be optical fibers each associated with a light-emitting diode or light-emitting films applied on the back of the display zone 19.

The different light sources 7 are arranged such that the corresponding light spots 25 displayed on the skin 17 in the display zone 19 are separated from each other and can be distinguished from each other. The display device 5 advantageously comprises more than two light sources 7 so as to increase the number of different patterns that can be displayed by the display device 5. It for example comprises five or nine light sources 7.

As illustrated in FIG. 1, the control unit 9 is connected to the output of the acquisition device 3 and the input of the display device 5. It is configured to receive the piece of information coming from the acquisition device 3. It comprises a database 27 in which the lighting sequences of the light sources 7 are stored. This database 27 associates each piece of information to be displayed with a specific lighting sequence of the light sources 7. The control unit 9 is capable of searching in the database 27 for the specific lighting sequence of the light sources 7 corresponding to the information from the acquisition device 3 and controlling the lighting of the light sources 7 of the display device 7 according to that specific lighting sequence.

The lighting sequence of the light sources 7 corresponds to the lighting of the light sources 7 according to a predefined succession stored in the database 27 and comprising the successive lighting of at least two light sources 7, more particularly of at least three light sources 7. The lighting of the light sources 7 according to the specific lighting sequence creates an animated pattern specific to the piece of information to be displayed. This animated pattern is formed by the sequence of formation of the light spots 25 resulting from the sequential lighting of the light sources 7.

A given lighting sequence may comprise simultaneous lighting of certain light sources 7 on the condition that it also comprises the successive lighting of at least two light sources 7.

Each lighting sequence is defined by:
the number of light sources 7 lit during the sequence;
the position of these light sources 7 and the lighting order;
the lighting duration of each light source 7;
the color of the light spot 25 formed by the light source 7; and/or
the intensity of the light spot 25 formed by the light source 7.

The control unit 9 is capable of individually controlling the power supply of each of the light sources 7 so as to control the lighting of the light sources 7 according to the stored sequence corresponding to the received information.

Figure 4:
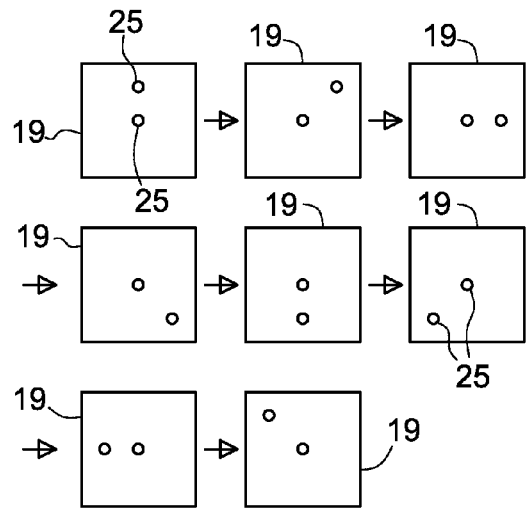
FIGS. 4 to 6 are examples of information display sequences according to the invention.
Figure 5:
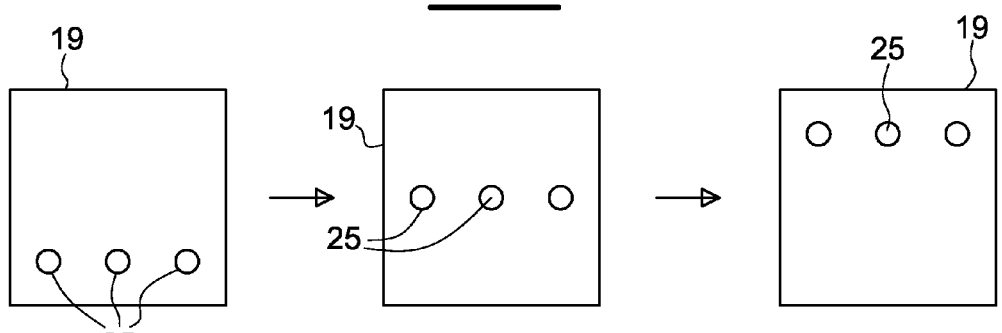
Figure 6:
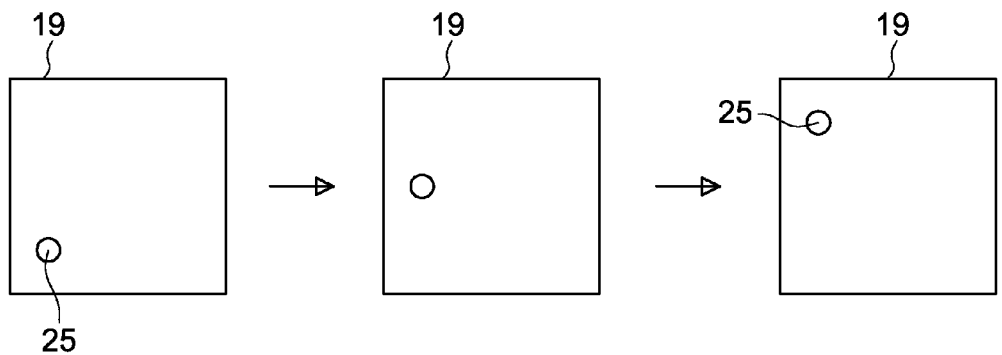

FIGS. 4 to 6 illustrate examples of lighting sequences. These lighting sequences are implemented by a display device 5 comprising nine light sources 7. In the sequence shown in FIG. 4, one of the light sources 7 remains permanently lit, while the other light sources 7 light up successively so as to create an animated pattern. This sequence for example indicates that an electrical circuit test is in progress. It is for example activated when a corresponding sensor 11 detects that the vehicle has been started. It is repeated as often as desired, and in particular for as long as the electronic circuit test has not been completed.

The sequence illustrated in FIG. 5 comprises the successive lighting of groups of at least two light sources, in particular three light sources 7, the light sources 7 of a same group being lit simultaneously. The groups of light sources 7 for example light up successively starting from the back moving toward the front so as to create an animated pattern. This pattern is repeated as often as desired, in particular for as long as the information continues to be detected by the sensor. The sequence illustrated in FIG. 5 for example corresponds to a speeding situation deduced from a speed measurement done by a speed sensor of the vehicle.

The sequence of FIG. 6 comprises the successive lighting of the light sources 7 positioned on the left side of the display zone 19. The corresponding sensor is for example a sensor detecting objects in a detection zone extending around the vehicle. The sequence indicates to the driver that a vehicle is passing his vehicle on the left.

The sequences of FIGS. 4 to 6 may be modified by modifying the color of the light spots 25, the lighting duration of the light sources 7 or the intensity of the spots 25. For example, in the case of speed, the lights may be lit with red and with a lighting duration decreasing toward the front to indicate speeding, and in green with a constant lighting duration to indicate a speed below or equal to the speed limit.

The trim element is not necessarily a dashboard. This element may be any other inner structure of the vehicle, for example a center console positioned between the two front seats of the vehicle, a trim panel of one of the vehicle doors, part of a seat of the vehicle, an armrest, or a trim panel of the vehicle roof, this list not being exhaustive.

The creation of an animated pattern by successively lighting the light sources 7 creates an impression of movement that draws the driver's attention to the information that is being transmitted to him and forms a "language" that is easy for the driver to understand without distracting him from driving. To that end, the lighting device 5 is advantageously positioned in an area that is easily visible by the driver, without the driver having to look away from the road.

Each piece of information relative to the motor vehicle is shown by a given animated pattern, formed by a given light spot formation or display sequence of light spots 25 in the display zone 19.

A light spot 25, considered alone, has no symbolic meaning in itself. The information relative to the vehicle is represented by the sequential display of the spots 25, more particularly by the succession, arrangement and optionally color of the displayed light spots 25.

The light spots 25, considered alone or in combination, do not form an alphanumeric symbol or a pictogram.

As an example, the display device 5 may be positioned between the steering column and the instrument panel, or in the upper central area of the dashboard.

Furthermore, the display system according to the invention makes it possible, using a same display device calling on a limited number of light sources, to communicate a large number of different pieces of information to the driver by displaying, for each piece of information, a specific animated pattern corresponding to a specific lighting sequence of the light sources. Thus, it is possible to add new types of information to be indicated to the driver without it being necessary to increase the dimensions of the display zone or decrease the space available to display other information.

Furthermore, the use of such light sequences avoids overloading the driver, since the information is suggested to him using the animated pattern rather than by being indicated by specific pictogram.

When the display device displays lighted zones such as color "spots" not forming a symbol of the pictogram or alphanumeric symbol type, the driver does not need to decipher the information transmitted by the display system 1 and can understand the information intuitively. Thus, he is not required to look directly at the display device 5 to understand the displayed information, which allows him to stay focused on driving the vehicle.

The invention claimed is:

1. A display system for displaying at least one piece of information relative to a vehicle in the passenger compartment of said vehicle, comprising:
    an information acquisition device for acquiring at least one piece of information related to the vehicle;
    a display device comprising at least two light sources, and which is configured to display the or each piece of information related to the vehicle in the passenger compartment of the vehicle and a display zone for the or each piece of information related to the vehicle;
    a control unit, which is configured to receive the or each piece of information acquired by the acquisition device and to control lighting of the light sources according to a stored pattern corresponding to each received piece of information,
    the system being characterized in that each light source is configured so as, when it is lit, to form a light spot in the display zone and in that, for each piece of information received by the control unit, the stored pattern comprises sequential lighting of the at least two light sources of the display device according to a lighting sequence depending on the received piece of information, the sequential lighting of the light sources resulting in sequential formation of light spots in the display zone so as to form an animated pattern in the display zone, the received piece of information being represented by the animated pattern.

2. The display system according to claim 1, wherein the lighting sequence is defined by the lighting order of the light sources, the length of lighting, the color and/or the intensity of each light source.

3. The display system according to claim 1, wherein the acquisition device comprises at least one sensor, capable of taking measurements relative to an operating parameter of the vehicle, at least one piece of information to be displayed by the display system being determined from the value of said parameter.

4. The display system according to claim 1, wherein the display device is capable of displaying at least two different pieces of information, each piece of information corresponding to a specific lighting sequence of the light sources.

5. The display system according to claim 1, wherein the display device comprises more than two light sources, the lighting sequence comprising the sequential lighting of at least two of said light sources.

6. The display system according to claim 1, wherein the light spots, considered alone or in combination with each other, do not form an alphanumeric symbol or a pictogram.

7. A vehicle comprising a display system according to claim 1.

8. The display system according to claim 1, wherein the display device is arranged to display the or each piece of information directly on an outer surface of a trim element of the vehicle.

9. The display system according to claim 1, wherein the display device is arranged to display the or each piece of information directly on an outer surface of the dashboard of the vehicle.

10. The display system according to claim 1, wherein the display zone is formed by a translucent area of a skin of the dashboard, the information is displayed directly onto the skin by diffusion of the light coming from each of the light sources through the translucent area of the skin, and the light sources are arranged behind the skin.

11. The display system according to claim 1, wherein each lighting sequence is defined by:
  a quantity of light sources lit during the sequence;
  a position of each light source lit and an order in which each light source is lit during the sequence;
  a lighting duration of each light source lit during the sequence;
  a color of the light spot formed by each light source lit during the sequence; and
  an intensity of the light spot formed by each light source during the sequence, wherein the control unit is configured to vary said lighting duration and/or said intensity among a plurality of different lighting sequences.

12. The display system according to claim 1, wherein the light sources are arranged in an array having at least two rows and at least two columns such that the system is able to display a two-dimensional animated pattern formed by the light spots.

13. The display system according to claim 1, wherein at least one lighting sequence results in the animated pattern formed by the light spots being animated along at least two distinct and non-parallel directions.

14. The display system according to claim 1, wherein at least one lighting sequence results in a one-dimensional animated pattern formed by the light spots.

15. The display system according to claim 1, wherein the piece of information related to the vehicle and represented by the animated pattern comprises at least a piece of information relating to an operating parameter of the vehicle, said operating parameter being a condition or status of a component or system that is part of the vehicle.

16. The display system according to claim 1, wherein the light sources are arranged so that not all of the light sources lie along the same straight line such that the system is able to display an animated pattern that is animated along at least two distinct and non-parallel directions.

17. The display system according to claim 1, wherein the light sources are arranged so that not all of the light sources lie along the same straight line such that the system is able to display a bidimensional pattern of light spots.

18. The display system according to claim 1, wherein at least one lighting sequence results in the animated pattern formed by the light spots being a bidimensional pattern animated along exactly one direction.

19. A method for displaying at least one piece of information relative to a vehicle using a display system according to claim 1, comprising the following steps:
  acquiring at least one piece of information relative to the vehicle;
  controlling the lighting of the at least two light sources based on each piece of information acquired during the acquisition step according to the stored pattern corresponding to each received piece of information; and
  displaying said animated pattern in the passenger compartment of the vehicle;
  characterized in that, for each acquired piece of information, the stored pattern comprises sequential lighting of the at least two light sources according to the lighting sequence that depends on the received piece of information, the sequential lighting of the light sources resulting in the sequential formation of light spots in the display zone so as to form the animated pattern in the display zone, the received piece of information being represented by the animated pattern.

* * * * *